US012580607B2

(12) United States Patent
Gao et al.

(10) Patent No.: US 12,580,607 B2
(45) Date of Patent: Mar. 17, 2026

(54) ACTIVE SINGLE-ENDED TRANSMISSION CABLE

(71) Applicant: Lerain Technology Co., Ltd., New Taipei City (TW)

(72) Inventors: Miaobin Gao, New Taipei City (TW); Heng-Ju Cheng, New Taipei City (TW); Hsin-Che Chiang, New Taipei City (TW); Hui-Chin Wu, New Taipei City (TW); Chia-Chi Hu, New Taipei City (TW); Yi Chuang, New Taipei City (TW)

(73) Assignee: LeRain Technology Co., Ltd., New Taipei City (TW)

( * ) Notice: Subject to any disclaimer, the term of this patent is extended or adjusted under 35 U.S.C. 154(b) by 39 days.

(21) Appl. No.: 18/600,249

(22) Filed: Mar. 8, 2024

(65) Prior Publication Data

US 2025/0096843 A1     Mar. 20, 2025

(30) Foreign Application Priority Data

Sep. 14, 2023    (TW) ................................ 112135145

(51) Int. Cl.
    *H04B 3/32*       (2006.01)
    *H04B 3/14*       (2006.01)

(52) U.S. Cl.
    CPC ................. *H04B 3/32* (2013.01); *H04B 3/14* (2013.01)

(58) Field of Classification Search
    CPC ..... H04L 25/0266; H04L 25/06; H04L 7/033; H04L 25/0272; H04L 25/0278; H04L 25/0298; H04L 25/028; H04L 43/50; H03F 1/0205; H03F 3/26; H03F 2200/114; H03F 2200/273; H03F 2200/451; H03F 2200/534; H03F 2200/541; H03F 2203/21106; H04B 1/18; H04B 14/062; H04B 1/1036; H04B 1/28; H04B 1/0475; H04B 1/0458; H04B 1/1018; H04B 1/16; H04B 1/1607
    See application file for complete search history.

(56) References Cited

U.S. PATENT DOCUMENTS

| | | | | |
|---|---|---|---|---|
| 2004/0066210 A1* | 4/2004 | Zakai | ................... | H04L 25/0278 |
| | | | | 326/30 |
| 2012/0012389 A1 | 1/2012 | Horan et al. | | |
| 2015/0022279 A1* | 1/2015 | Kaper | ................. | G06F 13/4068 |
| | | | | 333/26 |
| 2017/0017595 A1* | 1/2017 | Schnell | ............... | G06F 13/4286 |
| 2018/0131350 A1* | 5/2018 | Shimura | ............. | H03F 3/45475 |
| 2022/0060158 A1* | 2/2022 | Koya | .................... | H03F 1/0205 |

\* cited by examiner

*Primary Examiner* — Eva Y Puente
(74) *Attorney, Agent, or Firm* — Muncy, Geissler, Olds & Lowe, P.C.

(57) ABSTRACT

An active single-ended transmission cable is disclosed. The active single-ended transmission cable allows connection between a first and a second electronic device and comprises a first port, a second port, and a transmission wire. The first or second port is used for receiving or transmitting a differential signal between the first and the second electronic devices, and for converting between a differential signal and a single-ended signal. The transmission wire is used for transmitting the single-ended signal. This allows the conversion between the received or transmitted differential signal at the first and second ports into the single-ended signal so as to allow the transmission of the single-ended signal within the transmission wire.

3 Claims, 4 Drawing Sheets

ACTIVE SINGLE-ENDED TRANSMISSION CABLE

BACKGROUND OF THE INVENTION

1. Field of the Invention

The present invention relates to an active single-ended transmission line, particularly to an active single-ended transmission line that prevents the intra-pair skew when transmitting differential signals.

2. Description of the Related Art

With the advancement of technology, the demand for high-speed data transmission continues to grow, leading to the development of active cables capable of carrying multiple protocols for high speed datalink. However, as the operating frequencies become higher, the significant intra-pair skew generated by previous differential cables becomes increasingly critical to the signal integrity of the cable output. It is highly likely to increase difficulty for the receiver to determine whether the signal is 0 or 1, resulting in errors. The significance of intra-pair skew increases when the signal period is smaller at higher transmission rates. For example, if a one-meter differential cable introduces a 10 ps intra-pair skew at the output, it will reduce the eye width of the 1 Gb/s application by 1%. However, for a 50 Gb/s transmission rate application, this would lead to a 50% reduction in the output eye width. The eye pattern is a measure of signal distortion, where a larger eye width indicates less distortion and a smaller eye width indicates more distortion.

Therefore, it is necessary to invent a new active single-ended transmission line to address the severe intra-pair skew issues observed in the prior art for high-speed data transmission using differential cables.

SUMMARY OF THE INVENTION

The primary object of the present invention is to provide an active single-ended transmission line that avoids intra-pair skew when transmitting differential signals.

To achieve the object above, an active single-ended transmission line of the present invention can connect between a first electronic device and a second electronic device. The active single-ended transmission line includes a first connector port, a second connector port, and a transmission wire. Either the first connector port or the second connector port can be respectively connected to the first electronic device or the second electronic device for receiving or transmitting a differential signal between the first electronic device and the second electronic device and converting the differential signal into a single-ended signal. The transmission wire is connected between the first connector port and the second connector port to transmit a single-ended signal. Thus, a differential signal received or transmitted by the first connector port and the second connector port can be converted into a single-ended signal for transmission within the transmission wire.

BRIEF DESCRIPTION OF THE DRAWINGS

All of the objects and advantages of the present invention will become apparent from the following description of the accompanying drawings, which disclose several embodiments of the present invention. It should be understood that the drawings are used for purposes of illustration only, and not as a definition of the invention.

DETAILED DESCRIPTION OF THE PREFERRED EMBODIMENTS

Preferred specific embodiments are given below for better understanding of the technical contents of the present invention.

Figure 1:
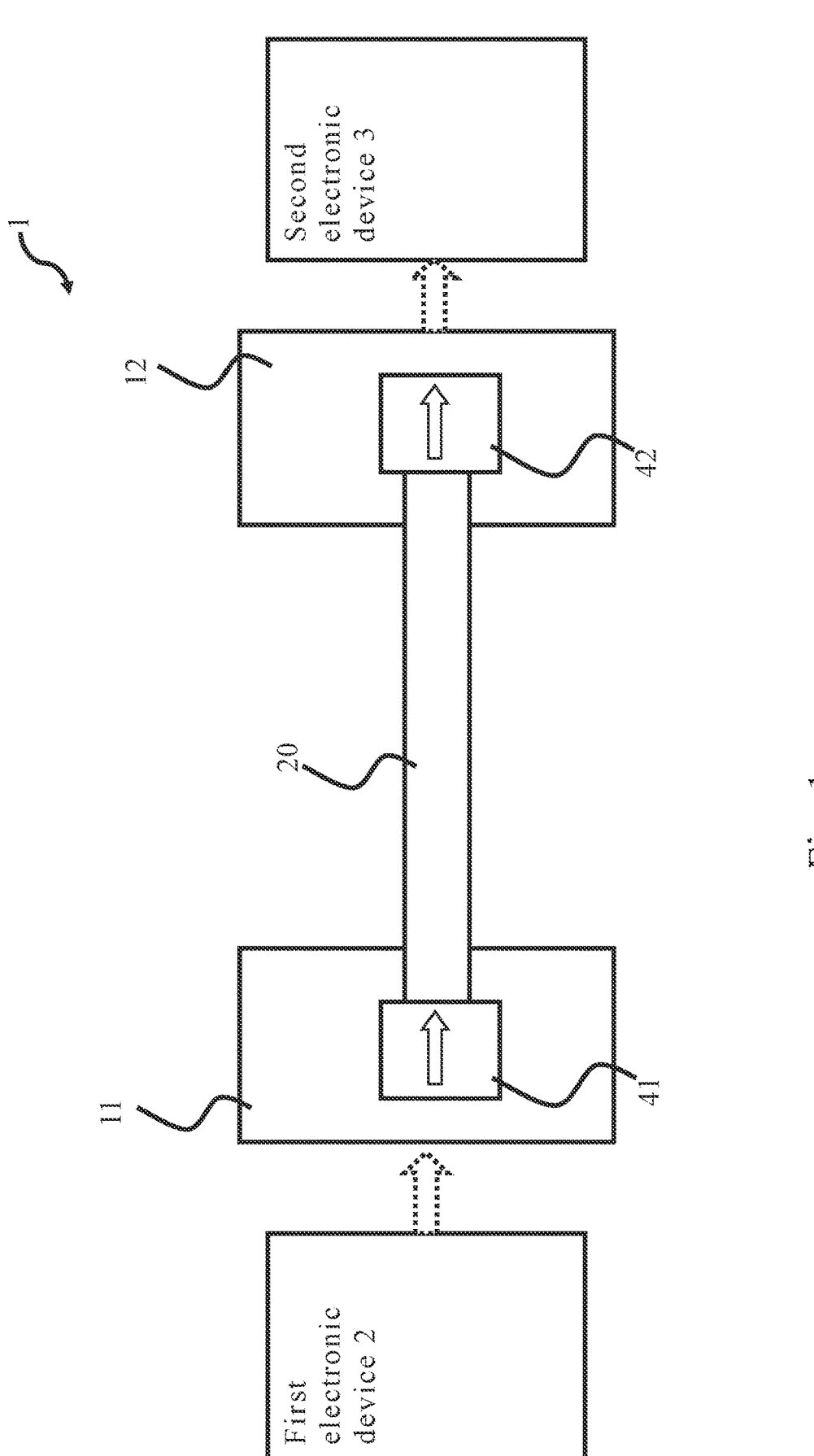
FIG. 1 illustrates a schematic diagram showing an active single-ended transmission line connecting between a first electronic device and a second electronic device in a first embodiment of the present invention.

Please refer to FIG. 1, which illustrates a schematic diagram showing an active single-ended transmission line connecting between a first electronic device and a second electronic device in a first embodiment of the present invention.

In the first embodiment of the present invention, the active single-ended transmission line 1 is an active cable suitable for high-speed data transmission and designed for inputting and outputting differential signals. The active single-ended transmission line 1 is connected between a first electronic device 2 and a second electronic device 3 using a first connector port 11 and a second connector port 12. The first electronic device 2 and the second electronic device 3 can be desktop computers, laptops, smartphones, tablets, wearable devices, or display screens. Both devices can serve as devices for transmitting and receiving differential signals. The active single-ended transmission line 1 is a bidirectional cable for transmitting differential signals, but the present invention is not limited to this purpose. The first electronic device 2 can be configured as a device that primarily outputs differential signals, and the second electronic device 3 can be configured as a device that receives differential signals. Thus, the active single-ended transmission line 1 can function as a unidirectional cable for transmitting differential signals. The specifications of the first connector port 11 and the second connector port 12 are not limited; they can be USB Type-A, Type-B, Type-C, or other specifications. It is important to note that the use of terms such as "first," "second," etc., in describing various components in the present invention is not intended to limit these components. These terms are used only to distinguish one component from another. For example, without departing from the scope of the various described embodiments, the first connector port 11 can be referred to as the second connector port 12, and vice versa. Both the first connector port 11 and the second connector port 12 are connector ports, but they are not the same connector port.

In the first embodiment of the present invention, the active single-ended transmission line 1 comprises a first connector port 11, a second connector port 12, and a plurality of transmission wires 20. The first connector port 11 or the second connector port 12 can be separately connected to the first electronic device 2 or the second electronic device 3 to facilitate the reception or transmission of a differential signal between the first electronic device 2 and the second electronic device 3 and to convert the differential signal into a single-ended signal. The transmission wires 20 are connected between the first connector port 11 and the second connector port 12 to transmit multiple single-ended signals. The present invention does not limit the number of transmission wires 20. This allows the differential signal received or transmitted by the first connector port 11 and the second connector port 12 to be converted into the single-ended signal so as to facilitate the transmission of the single-ended signal within the transmission wire 20. The transmission of a single-ended signal within the transmission wire 20 helps to prevent intra-pair skew that may occur during the transmission of a differential signal.

The first connector port 11 and the second connector port 12 can be adapted for the conversion between differential signals and single-ended signals by using converting chips or circuit modules on integrated circuit boards, and the present invention is not limited to the examples mentioned above. In the first embodiment of the present invention, the first connector port 11 includes a first gain module 41, and the second connector port 12 includes a second gain module 42. The first gain module 41 compensates for signal loss on the path from the first electronic device 2 to the first connector port 11 and compensates for loss of gain during the conversion of the differential signal to the single-ended signal. The second gain module 42 compensates for signal loss on the path of the transmission wire 20 and can also compensate for loss of gain during the conversion of the differential signal to the single-ended signal and then converting the single-ended signal back into the differential signal. In this embodiment, the active single-ended transmission line 1 is configured to receive the differential signal through the first connector port 11 and convert it into the single-ended signal. Subsequently, the second connector port 12 converts the single-ended signal back into the differential signal for output.

Figure 2:
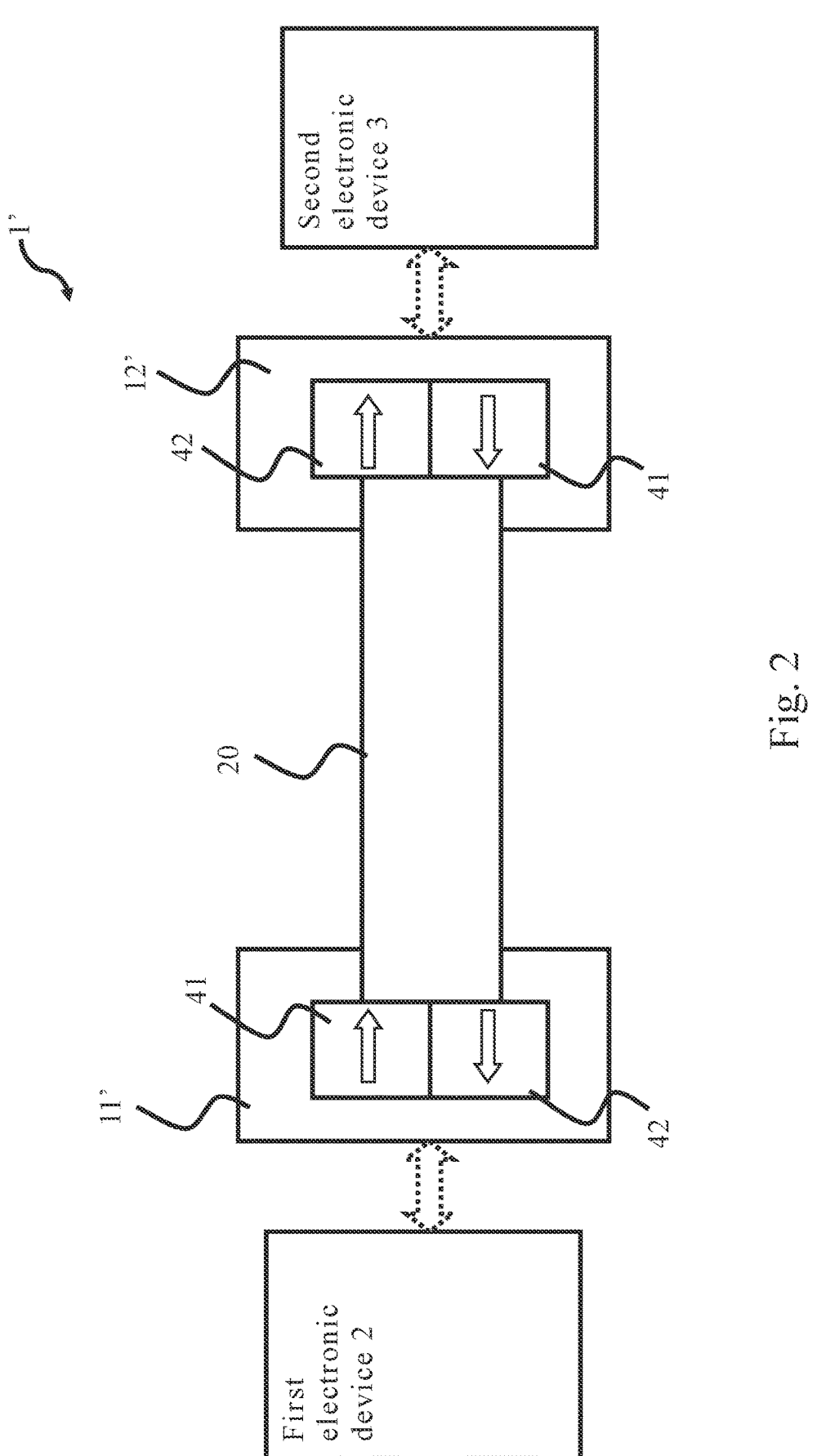
FIG. 2 illustrates a schematic diagram showing an active single-ended transmission line connecting between the first electronic device and the second electronic device in a second embodiment of the present invention.

Please refer to FIG. 2, which illustrates a schematic diagram showing an active single-ended transmission line connecting between the first electronic device and the second electronic device in a second embodiment of the present invention.

In the second embodiment of the present invention, both the first connector port 11' and the second connector port 12' of the active single-ended transmission line 1' include both the first gain module 41 and the second gain module 42. Therefore, both the first connector port 11' and the second connector port 12' can convert differential signals into single-ended signals and vice versa. Consequently, the first connector port 11' and the second connector port 12' can bidirectionally input and output differential signals.

Figure 3:
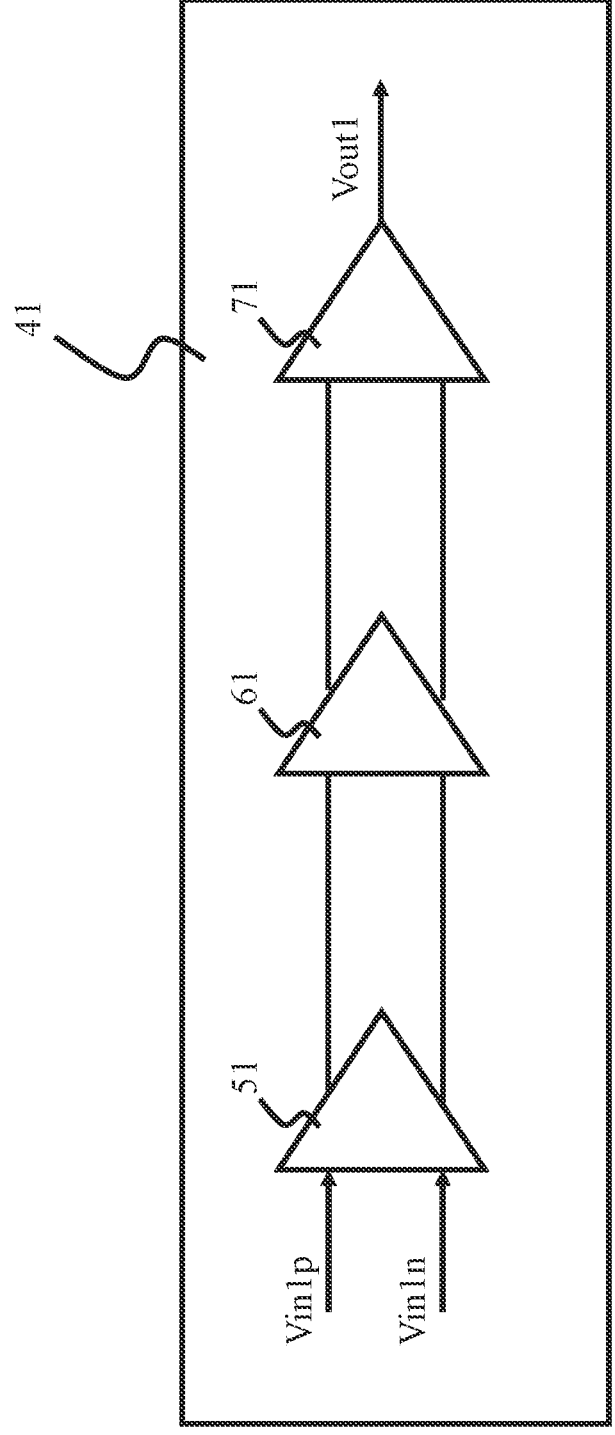
FIG. 3 illustrates an internal structural schematic showing the first gain module of the active single-ended transmission line of the present invention.

Please refer to FIG. 3, which illustrates an internal structural schematic showing a first gain module of the active single-ended transmission line of the present invention.

The first gain module 41 comprises a first flat gain module 51, a first peak gain module 61, and an output buffer module 71. The first flat gain module 51 compensates for broadband gain loss, and the first peak gain module 61 compensates for frequency-dependent channel loss. The output buffer module 71 is configured as a 2-to-1 specification and receives the differential input signal, then converts it into the single-ended signal, and outputs it.

In the embodiment of the present invention, the transfer function H1(S) of the first gain module 41 can be expressed as:

$$H1(s) = \frac{Vout}{Vin1p - Vin1n} = G1_{flat}(s) \cdot G1_{peak}(s)$$

where Vin1p and Vin1n represent the input differential signals, Vout1 is the output single-ended signal, and $G1_{flat}(s)$ and $G1_{peak}(s)$ are the frequency responses of the first flat gain module 51 and the first peak gain module 61, respectively. The output buffer module 71 is assumed as ideal unity gain buffer for simplifying the transfer function. By adjusting the first flat gain module 51, the flat gain of the first gain module 41 can be tuned to compensate for the broadband gain loss during the conversion of the differential signal to a single-ended signal. Additionally, by adjusting the first peak gain module 61, the frequency response peak position of the first gain module 41 can be tuned to compensate for frequency-dependent channel loss associated with various transmission line lengths and data rates. Finally, the adjusted differential signal is converted into a single-ended signal and output using the output buffer module 71.

Figure 4:
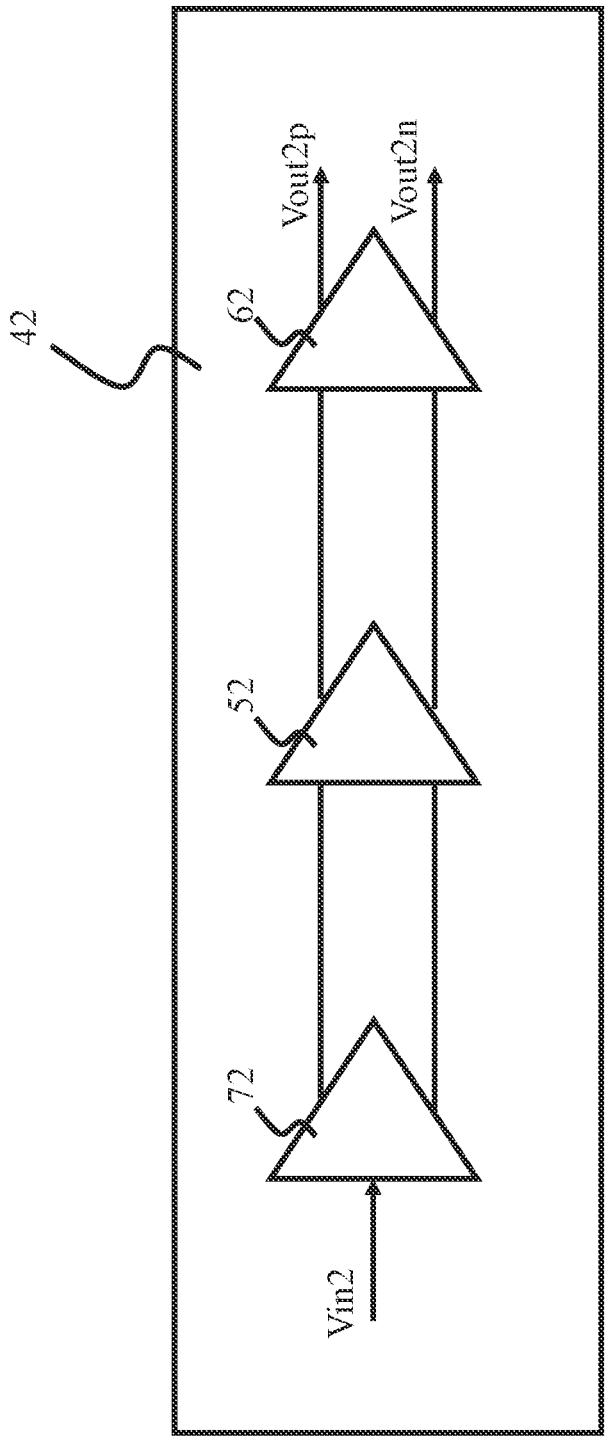
FIG. 4 illustrates an internal structural schematic showing the second gain module of the active single-ended transmission line of the present invention.

Please refer to FIG. 4, which illustrates an internal structural schematic showing a second gain module of the active single-ended transmission line of the present invention.

The second gain module 42 comprises an input buffer module 72, a second flat gain module 52, and a second peak gain module 62. The input buffer module 72 is designed as a 1-in-2-out specification and receives the single-ended signal, then converts it into the differential signal. The second flat gain module 52 compensates for broadband gain loss, and the second peak gain module 62 compensates for frequency-dependent channel loss.

In the embodiment of the present invention, the transfer function H2(S) of the second gain module 42 can be expressed as:

$$H2(s) = \frac{Vout2p - Vout2n}{Vin2} = G2_{flat}(s) \cdot G2_{peak}(s)$$

where Vout2p and Vout2n represent the output differential signals, Vin2 is the input single-ended signal, and $G2_{flat}(s)$ and $G2_{peak}(s)$ are the frequency responses of the second flat gain module 52 and the second peak gain module 62, respectively. The input buffer module 72 is assumed as ideal unity gain buffer for simplifying the transfer function. Initially, the input buffer module 72 converts the single-ended signal into a differential signal and outputs it. Subsequently, by adjusting the second flat gain module 52, the flat gain of the second gain module 42 can be tuned to compensate for the broadband gain loss during the conversion of single-ended signals to differential signals. Additionally, adjusting the second peak gain module 62 allows for tuning of the frequency response peak position of the second gain module 42 to compensate for frequency-dependent channel loss for various transmission line lengths and data transmission rates.

From the above description, it can be understood that the active single-ended transmission line 1 of the present invention, utilizing its internal first gain module 41 and second gain module 42, prevents intra-pair skew during the transmission of differential signals while compensating for loss during signal transmission.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An active single-ended transmission line, which is connected between a first electronic device and a second electronic device, the active single-ended transmission line comprising:

a first connector port;

a second connector port, wherein either the first connector port or the second connector port can be respectively connected to the first electronic device or the second electronic device for receiving or transmitting a differential signal between the first electronic device and the second electronic device and converting the differential signal into a single-ended signal; and a transmission wire connecting between the first connector port and the second connector port to transmit a single-ended signal; thus, the differential signal received or transmitted by the first connector port and the second connector port can be converted into the single-ended signal so as to transmit the single-ended signal within the transmission wire; wherein the first connector port includes a first gain module, and the second connector port includes a second gain module, wherein the first gain module and the second gain module are used to compensate for a loss of gain during the conversion of the differential signal to the single-ended signal for transmission and compensate for the loss on the transmission path.

2. The active single-ended transmission line as claimed in claim 1, wherein the first gain module includes a first flat gain module, a first peak gain module, and an output buffer module; the first flat gain module compensates for broadband gain loss; the first peak gain module compensates for frequency-dependent channel loss; and the output buffer module converts the differential signal into the single-ended signal.

3. The active single-ended transmission line as claimed in claim 1, wherein the second gain module includes an input buffer module, a second flat gain module, and a second peak gain module; the input buffer module converts the single-ended signal into the differential signal; the second flat gain module compensates for broadband gain loss; and the second peak gain module compensates for frequency-dependent channel loss.

*　*　*　*　*